Aug. 19, 1947.   C. ROZANEK   2,425,831
MOLDING APPARATUS
Filed May 12, 1945   2 Sheets-Sheet 1

INVENTOR
C. ROZANEK
BY
ATTORNEY

Aug. 19, 1947.  C. ROZANEK  2,425,831
MOLDING APPARATUS
Filed May 12, 1945  2 Sheets-Sheet 2
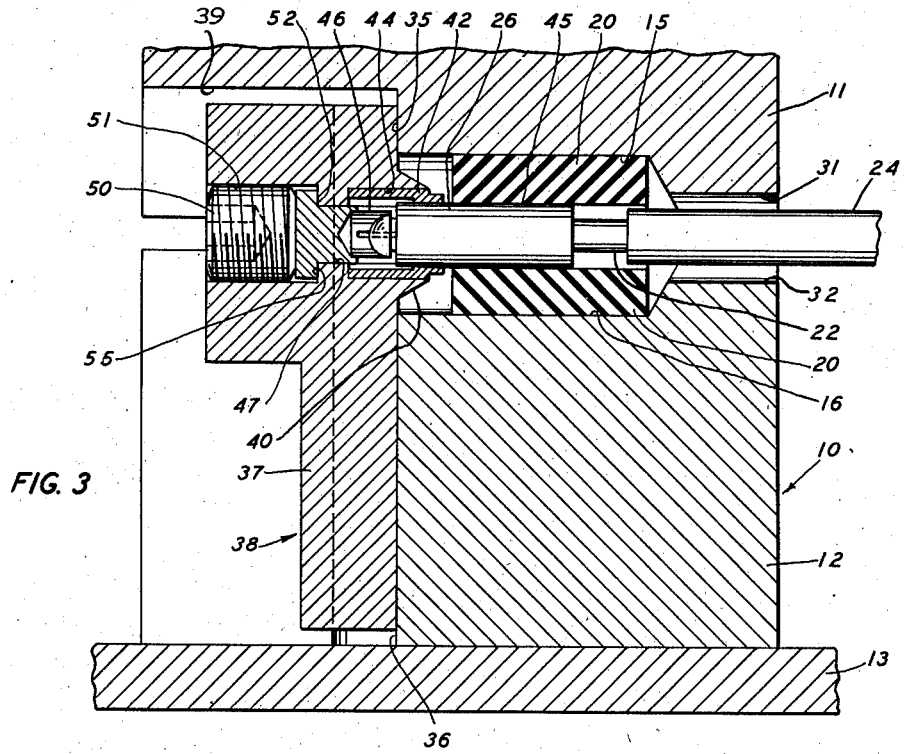
FIG. 3
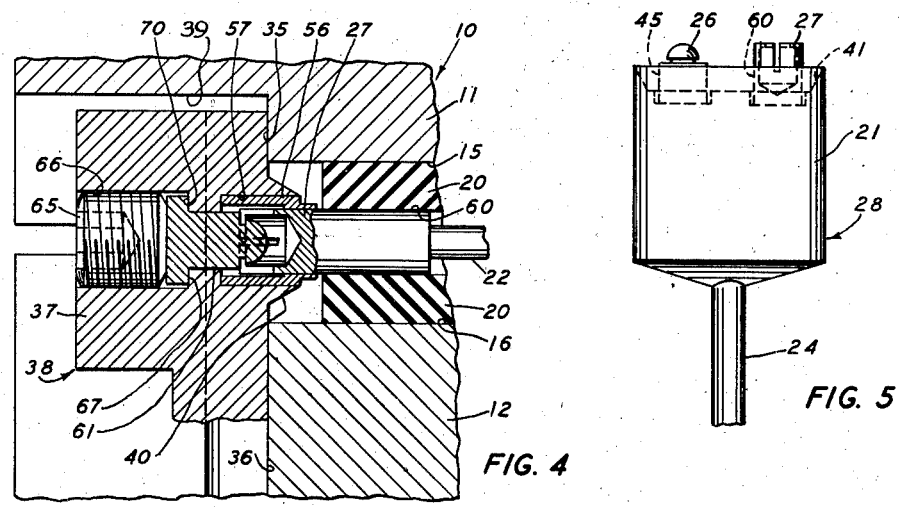
FIG. 4
FIG. 5
INVENTOR
C. ROZANEK
BY
ATTORNEY Patented Aug. 19, 1947

2,425,831

UNITED STATES PATENT OFFICE 2,425,831

MOLDING APPARATUS

Charles Rozanek, Baltimore, Md., assignor to Western Electric Company, Incorporated, New York, N. Y., a corporation of New York Application May 12, 1945, Serial No. 593,503

7 Claims. (Cl. 18—36)

This invention relates to molding apparatus and has for its object the provision of new and improved molding apparatus.

A molding apparatus constituting one embodiment of the invention includes a pair of companion mold sections having complementary molding recesses formed therein for molding a mass of material into a jacket over a core of a predetermined configuration, and a gauge block having a portion thereof complementary in shape to the shape of a core positioned in the recess for orienting the core with respect to the recess.

A complete understanding of the invention may be obtained from the following detailed description of a molding apparatus forming one embodiment thereof, when read in conjunction with the appended drawings, in which Fig. 1 is a fragmentary, top plan view of a mold section forming a part of a mold embodying the invention;

Fig. 3 is a fragmentary, vertical section of the mold taken along line 3—3 of Fig. 1;

Fig. 4 is a fragmentary, vertical section of the mold taken along line 4—4 of Fig. 1, and Fig. 5 is a fragmentary, top plan view of an article molded in the mold.

Figure 1:
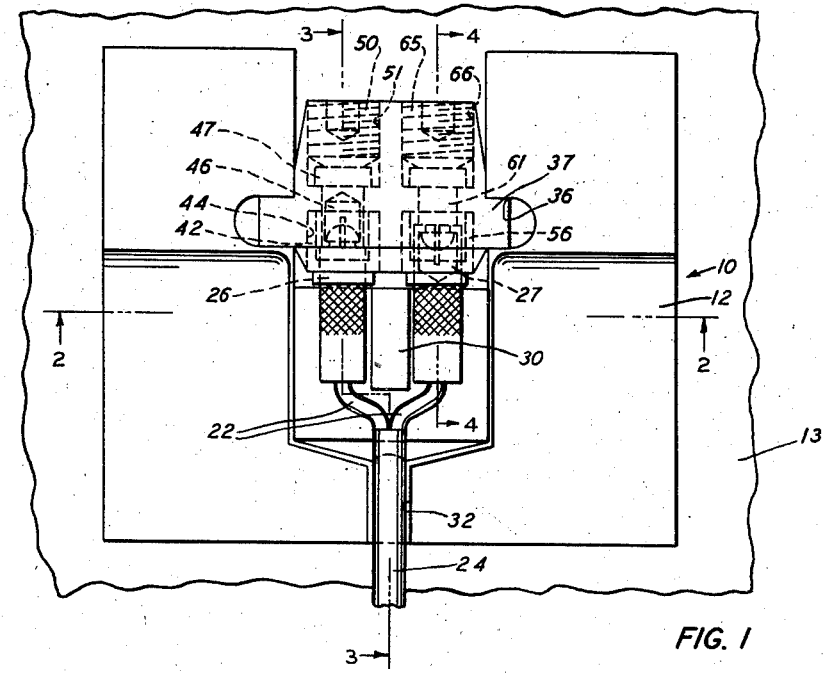

Referring now in detail to the drawings, there is shown therein a mold 10 (Fig. 3), which includes an upper mold section 11 and a lower mold section 12 secured to a base plate 13. The upper mold section is provided with a molding recess 15, and the lower mold section has a molding recess 16 formed therein, which is complementary to the molding recess 15. When the mold sections are moved together the molding recesses form a molding cavity.

Figure 2:
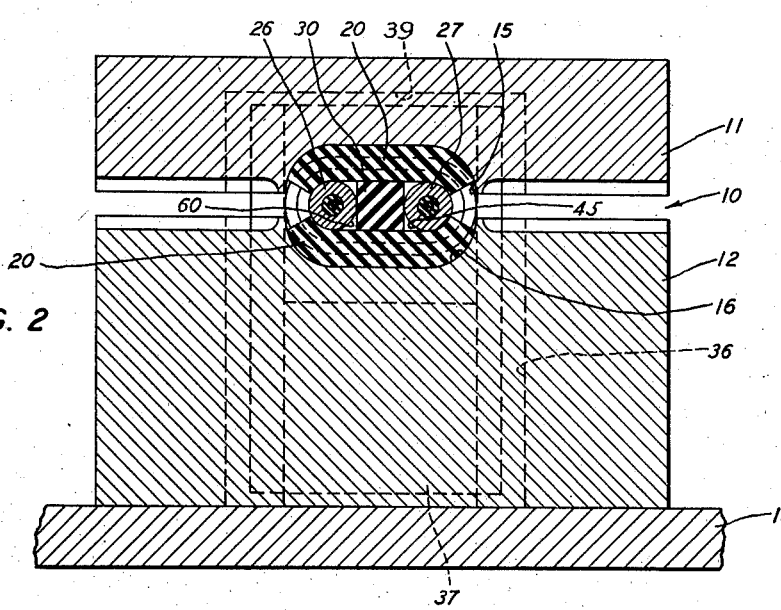
Fig. 2 is a fragmentary, vertical section of the mold taken along line 2—2 of Fig. 1.

The mold 10 is designed to mold masses 20—20 made of insulating material into an insulating block 21 (Fig. 5) over individually insulated conductors 22—22 (Fig. 1) of a jacketed cord 24, a male terminal 26, a female snap-on terminal 27 and a spacer block 30 (Fig. 2), whereby a plug 28 is formed. The upper mold section 11 is provided with a groove 31 (Fig. 3) and the lower mold section is provided with a groove 32, which form a passage fitting snugly around the cord 24 when the upper and lower mold sections are in molding relationship, at which time they abut each other.

A gauge block 37 of a floating gauge 38 fits slidably in a guideway 36 in the lower mold section 12 and bears against a surface 35 formed in the upper mold section 11. The gauge block is removable from the guideway 36 and is of such length that its ends abut a surface 39 formed on the mold section 11 and the base plate 13 when the upper mold section and the lower mold section are in molding relationship. At this time a tapered projection 40 on the gauge block is centered with respect to the molding cavity formed by the molding recesses 15 and 16, and it serves to form a cup-shaped cavity 41 (Fig. 5) in the plug 28.

A bushing 42 (Fig. 3) fits in a socket 44 formed in the gauge block 37 and serves to fit snugly over a cylindrical portion 45 of the terminal 26. The bushing 42, together with a dummy female snap-on terminal 46, serves to properly position the terminal 26 with respect to the molding recesses 15 and 16. The dummy terminal 46 is secured in a bore 47 formed in the gauge block 37 by a screw 50 threaded into a tapped bore 51 formed in the gauge block. The screw 50 serves to press a shoulder 52 of the terminal 46 against a bottom 55 of the tapped bore 51. The male terminal 26 may be inserted through the bushing 42 and locked therein by the dummy female snap-on terminal 46, whereby the terminal 26 is properly oriented with respect to the floating gauge 38.

A bushing 56 (Fig. 4) positioned in a socket 57 formed in the gauge block 37 serves to receive a cylindrical portion 60 of the terminal 27 to orient the terminal 27 with respect to the floating gauge 38. A dummy male terminal 61 serves to engage the female snap-on terminal 27 and to hold the terminal 27 against accidental longitudinal, lateral or angular movement thereof. A screw 65 fitted into a tapped bore 66 formed in the gauge block 37 serves to press a shoulder 67 formed on the dummy terminal 61 against a bottom 70 of the bore 66.

In the operation of the mold 10, the floating gauge 38 is removed from the guideway 36 of the mold section 12. The male terminal 26 then is inserted into the bushing 42 and is locked therein by the dummy female snap-on terminal 46, and the female snap-on terminal 27 is inserted simultaneously therewith into the bushing 56 and into interlocking engagement with the dummy male terminal 61. One of the masses 20—20 is then placed in the molding recess 16, the floating gauge then is inserted into the guideway 36, and the cord 24 is laid in the groove 32. The other mass 20 then is laid upon the terminals 26 and 27.

The mold sections 11 and 12 then are pressed together by suitable means, such as a hydraulic or air press (not shown), and when they are so pressed, the gauge block 37 is held in abutting relationship with the surface 39 and the base plate 13. At this time the projection 40 formed on the gauge block 37 is centrally located with respect to the molding recesses 15 and 16 and serves therewith to form the molding cavity. The mold 10 is heated by suitable heating means, such as heated platens (not shown), and the masses 20—20 of insulating material are molded into the insulating block 21 (Fig. 5). The mold sections 11 and 12 then are separated, the floating gauge is withdrawn therefrom, after which the terminals 26 and 27 are pulled out of interlocking engagement with the terminals 46 and 61, respectively, and the bushings 42 and 56, respectively. The molding operation described hereinabove then may be repeated to mold another insulating block identical with insulating block 21.

A second floating gauge (not shown) identical with the floating gauge 38 may be provided for alternate use with the gauge 38. If it is so provided, one of the floating gauges may be loaded while the other is being used in a molding operation. After this molding operation is completed, the last-mentioned floating gauge is removed from the mold 10 and the just loaded floating gauge is placed therein so that the next molding operation may be started before unloading the removed floating gauge.

The mold 10 serves to properly orient terminals, such as the terminals 26 and 27 with respect to the molding recesses 15 and 16 so that the insulating blocks similar to the insulating block 21 (Fig. 5) properly cover the terminals. The terminals similar to the terminals 26 and 27 may be correctly oriented with respect to the mold 10 simply by snapping them into the bushings 42 and 56 and into engagement with the dummy terminals 46 and 61, and inserting the floating gauge into the guideway 36. Thus, the mold 10 facilitates the insertion of terminals 26 and 27 therein. Likewise, terminals 26 and 27 may be easily removed from the mold 10 after the insulating block 21 has been molded therearound.

The floating gauge 38 may be adapted to fasten securely terminals of types or sizes other than the terminals 26 and 27 simply by substituting bushings and dummy terminals complementary to the substituted terminals for the bushings 42 and 56 and the dummy terminals 46 and 61. Also, the bushings 42 and 56 and the dummy terminals 46 and 61 may be removed easily from the gauge block 37 for maintenance purposes.

If it is so desired, a plurality of molding recesses and guideways may be formed in the mold 10, and a plurality of floating gauges inserted therein to adapt the mold to mold several insulating blocks at each operation thereof.

What is claimed is:

1. In a molding apparatus, a pair of relatively movable mold sections having complementary molding recesses formed therein for molding a mass of material over a connector, and a gauge mounted in floating relationship with respect to the die sections and provided with a snap-on dummy connector complementary to the first-mentioned connector for receiving it to orient it with respect to the recesses.

2. In a molding apparatus, a pair of companion mold sections having complementary molding recesses formed therein for molding a mass of material over a male snap-on connector, and a gauge mounted in floating relationship with respect to the mold sections and provided with a dummy female snap-on connector for receiving the male snap-on connector to orient it with respect to the molding recesses.

3. In a molding apparatus, a pair of companion mold sections having complementary molding recesses formed therein for molding a mass of material over a female snap-on connector, and a gauge having a dummy male snap-on connector for fitting into the female snap-on connector to orient it with respect to the molding recesses.

4. In a molding apparatus, a pair of relatively movable mold sections having complementary molding recesses formed therein for molding a mass of material over a core having a pair of cylindrical projections, and a gauge having a pair of sockets formed therein for receiving the pair of cylindrical portions of the core to secure the core in an oriented position with respect to the recesses.

5. In a molding apparatus, a pair of mold sections having complementary molding recesses formed therein and one of said mold sections being provided with a guideway, said mold sections being movable into molding relationship, a floating gauge mounted slidably in the guideway and having projecting therefrom a dummy terminal of a snap-on type for engaging a terminal of a snap-on type to position the terminal in the molding recesses, said floating gauge being held in abutment with the end of the guideway and a surface on the complementary mold section when the mold sections are in molding relationship.

6. In a molding apparatus, a mold section having a molding recess formed therein and also provided with a guideway positioned at an end of the molding recess and extending transversely thereto, a second mold section movable toward and away from the first-mentioned mold section and provided with a molding recess complementary to the first-mentioned molding recess, a removable gauge block slidably mounted in said guideway and having a pair of sockets formed therein, a pair of bushings positioned in the sockets, a female dummy terminal positioned in one of the sockets, and a male dummy terminal positioned in the other of the sockets.

7. In a molding apparatus, a pair of relatively movable mold sections having complementary molding recesses formed therein for molding a mass of material over a member, and a gauge mounted in floating relationship with respect to the die sections and provided with a detachable dummy element complementary to the first mentioned member for receiving it to orient it with respect to the recesses.

CHARLES ROZANEK.

REFERENCES CITED

The following references are of record in the file of this patent:

UNITED STATES PATENTS

| Number | Name | Date |
| --- | --- | --- |
| 1,534,730 | Hansen | Apr. 21, 1925 |

FOREIGN PATENTS

| Number | Country | Date |
| --- | --- | --- |
| 406,849 | Great Britain | Mar. 8, 1934 |